United States Patent [19]
Arion

[11] 3,969,243
[45] July 13, 1976

[54] MOVING BED ION-EXCHANGE APPARATUS AND OPERATING METHOD THEREOF

[75] Inventor: Nicolae Mihail Arion, Bucharest, Romania

[73] Assignee: Institutul de Proiectari Tehnologice Pentru Industria Chimica-Iprochim, Bucharest, Romania

[22] Filed: Aug. 5, 1974

[21] Appl. No.: 495,070

[30] Foreign Application Priority Data
Aug. 6, 1973 Romania.................................. 75734

[52] U.S. Cl..................................... 210/25; 210/33; 210/96 R; 210/189
[51] Int. Cl.² ................................................... B01D 15/02
[58] Field of Search............... 71/34; 210/25, 33, 96, 210/97, 189, 263, 264, 268

[56] References Cited
UNITED STATES PATENTS

| | | | |
|---|---|---|---|
| 2,963,431 | 12/1960 | Dorn et al........................ | 210/189 X |
| 2,969,297 | 1/1961 | Grosvenor, Jr..................... | 210/33 X |
| 3,208,934 | 9/1965 | Kingsbury........................ | 210/33 |
| 3,220,552 | 11/1965 | Staats............................ | 210/189 X |
| 3,492,092 | 1/1970 | Higgins........................... | 71/34 |
| 3,512,642 | 5/1970 | Bevans............................ | 210/268 X |
| 3,579,322 | 5/1971 | Higgins........................... | 71/34 |
| 3,580,842 | 5/1971 | Higgins........................... | 210/25 |
| 3,677,937 | 7/1972 | Higgins et al..................... | 210/189 X |
| 3,775,088 | 11/1973 | Higgins........................... | 210/33 X |
| 3,915,861 | 10/1975 | Marquardt........................ | 210/189 |

*Primary Examiner*—Charles N. Hart
*Assistant Examiner*—Robert G. Mukai
*Attorney, Agent, or Firm*—Karl F. Ross; Herbert Dubno

[57] ABSTRACT

A method of and an apparatus for the moving-bed ion-exchange treatment of a salt-containing solution, especially for the treatment of the effluence of a fertilizer plant. The ion-contaminated aqueous solution is conducted through a first zone in an upright column containing the ion-exchange resin to remove contaminating ions. The liquid free from the contaminating ions is led from this zone and the bed is hydraulically displaced to a second zone in the bight between the aforementioned column and a second vertical column. In the bight, the bed is confined between two valve members and is rinsed and cooled with a rinsing and cooling liquid. The resin is then hydraulically displaced into the second column where it is treated with a regenerating solution, is then rinsed and is hydraulically transported to the first column.

6 Claims, 6 Drawing Figures

MOVING BED ION-EXCHANGE APPARATUS AND OPERATING METHOD THEREOF

FIELD OF THE INVENTION

The present invention relates to a moving bed ion-exchange apparatus and process, designed for demineralization or softening of brackish waters, concentration of dilute solutions of certain valuable salts, organic or inorganic solution purification, waste-water treatment, heterogeneous catalysis with ion-exchange resins and other similar ion-exchange technologies.

The ion-exchange apparatus of this invention is designed to treat waste waters discharged from nitrogen-fertilizer and/or NPK complex-fertilizer plants under advantageous conditions from the techno-economical standpoint.

BACKGROUND OF THE INVENTION

Known moving bed ion-exchange apparatus can be either continuous or discontinuous, with a fluidized or a compact bed.

In one apparatus, of the parallel-columns type, the columns are connected at their ends through curvilinear sections, ion-exchange resin in the loading zone is gradually saturated in small increments after which the saturated resin portion is moved upward by hydraulic ram action into a backwash zone; from the latter it is passed into a pulse zone and is further transferred into a regeneration zone thereby entering a rinse zone from which it is returned to the saturation zone.

With this ion-exchange apparatus, the regeneration and rinse zones are not separated by valves and are dimensioned so as to receive additional portions of saturated resin.

Water introduced into the rinse zone dilutes the regenerant at the zone contact interface. Likewise, the pulse water dilutes the regeneration effluent at the contact interface.

In order to avoid the dilution of regenerant and the regenerating effluent and to keep the interface at a steady state (rinse water — regenerant — pulse water — regeneration product) it is absolutely necessary to control each pulse cycle, with automatic valves operated by interface analyzers. Because it is necessary to maintain constant level control of separating interfaces, rinse water and regenerating agent flow rates must be constant, which requires the removal of saturated resin portions from the loading zone at a constant frequency controlled in accordance with a predetermined time schedule.

Under the circumstances required by the treatment of salt-rich and time-variable composition liquids and by the use of highly concentrated regenerants, and with respect to the need for minimizing the degradation of physico-chemical characteristics of the ion-exchange resins, this apparatus has a number of disadvantages, such as:

the need for buffer tanks with large volumes for homogenizing and maintaining the influent composition constant;

degradation of cationic resins due to the high temperature at the contact interface between rinse zone and regeneration zone on account of the high exothermicity of the dilution of strong acids with wash water;

dilution of regeneration effluent and lowering of loading rate in case of interface analyser malfunction within the regeneration-rinse zones; and significant mechanical degradation of ionic resins in consequence of high operating pressure in the regeneration-rinse zones as well as of resin swelling in the case of using carboxyl-cation or weak base and strong base anion-exchange resins in the saturation zone, where high internal pressures result where the spaced is limited by valves.

SUMMARY OF THE INVENTION

The moving bed ion-exchange apparatus of the invention removes these disadvantages by having two vertical cylinder-like columns, bottom-connected, consisting of: a loading section where the influent, uniformly distributed through filtering systems arranged at the bottom, moves upwardly into the fresh resin bed and is discharged by collecting-filtering systems at the upper part. At about two-thirds of the resin bed height between the headers and manifolds, we provide sampling pipes for the treated liquid which is continuously monitored by a specific analyze, sensing the physico-chemical characteristics of the respective liquid with a view to signalling the exhaustion of the ion-exchange resin in the space between the distributing system and the distributing system and the sample intake pipes.

The loading section is connected by a butterfly or knife gate valve to a curvilinear section for the conditioning of the exhausted ion-exchange resin, equipped at its opposite ends with a distribution-filtering system for the resin-conditioning liquid and with a collecting-filtering system of the resin-conditioning liquid respectively.

This section is connected by means of a butterfly or knife gate valve to a regeneration section for the conditioning of exhausted resin with either diluted strong acids or bases in accordance with the U.K. Patent No. 1,331,948/1970, as well as rinsing out of the regeneration product and excess regenerant with water. The regeneration section has its ends provided with filtering flanges formed with nozzles, distributing and collecting circular pipes, radial channels, liquid circular spaces and circular filtering elements.

The latter section is connected by by means of a butterfly or knife gate valve to a backwash section in which the final washing or regenerant in excess is done concomitantly with the resin backwashing to remove fine particles. The backwash section is provided at its bottom with distributing systems for backwash and rinse water, and at the upper part with backwash and rinse-water-collecting pipes.

This section is traversed by a vertical, axial siphon-type pipe, equipped with a butterfly or knife gate valve through which regenerated ion-exchange resin, rinsed backwashed, is carried hydraulically to an ion-exchange resin storage, section placed above the loading section and which has its upper part fixed to the transfer pipe by means of a taper portion and its bottom provided with a liquid resin interface sensor and a filtering system to collect and discharge the resin transfer water from the backwash section to the storing section. These sections are provided with feeding and discharging pipes for treated and auxiliary liquids used for resin hydraulic transfer, resin conditioning, regeneration and washing, for and generation of a hydraulic counterpressure for the resin bed, imparting flexible compactness thereto during resin exhausting in the loading section, and with control and measuring instruments and pneumatic and electric devices to operate the valves on the respective pipes and the isolating butterfly - or knife gate valves arranged between the said sections.

The moving bed ion-exchange apparatus of the invention has the following advantages:

- it allows the treatment of liquid influents at variable rates corresponding to liquid velocities in the loading section from 10 to 100 m/h with time — variable ion-exchange loading, ion resin being transferred from the loading section to regeneration only after its complete exhaustion, thereby operating with stability and a constant duty cycle, in the conditioning, regeneration, backwash and storing sections;

- it offers the possibility of using highly concentrated regenerants, such as 45–60% $HNO_3$, 30–50% $H_2SO_4$, 35–40% $H_3PO_4$, 17–25% $NH_3$, by observing the operating conditions according to U.K. Pat. No. 1331948/1970;

- it enables obtaining of concentrated effluents from the regenerating operation by the fractional selection of liquid product from regeneration;

- it permits liquid influents having a high temperature to be treated, because by cooling the resin in the conditioning section in direct contact with a cooling liquid, the temperature conditions required for regeneration can be assured;

it permits maximum resin saturation capacity by performing the exhaustion operation in an upward liquid and countercurrent regeneration;

it minimizes mechanical degradation of the ion-exchange resin because the resin is maintained with flexible compactness within the exhaustion zone at a low operating pressure range (2–4 $Kgf/cm^2$), and because the resin flows by gravity from the storing section to the other sections, and also because of the small depth of the resin beds in the respective sections;

it avoids plugging of the resin bed in the loading section by placing the backwash section before the loading section;

and it ensures safety of operation because the instrumentation installed is as limited as possible;

BRIEF DESCRIPTION OF THE DRAWING

Still further aspects of the objects of this invention will be apparent from the following description with reference to the attached drawing. In the drawing.

SPECIFIC DESCRIPTION AND EXAMPLES

EXAMPLE 1

Figure 1:
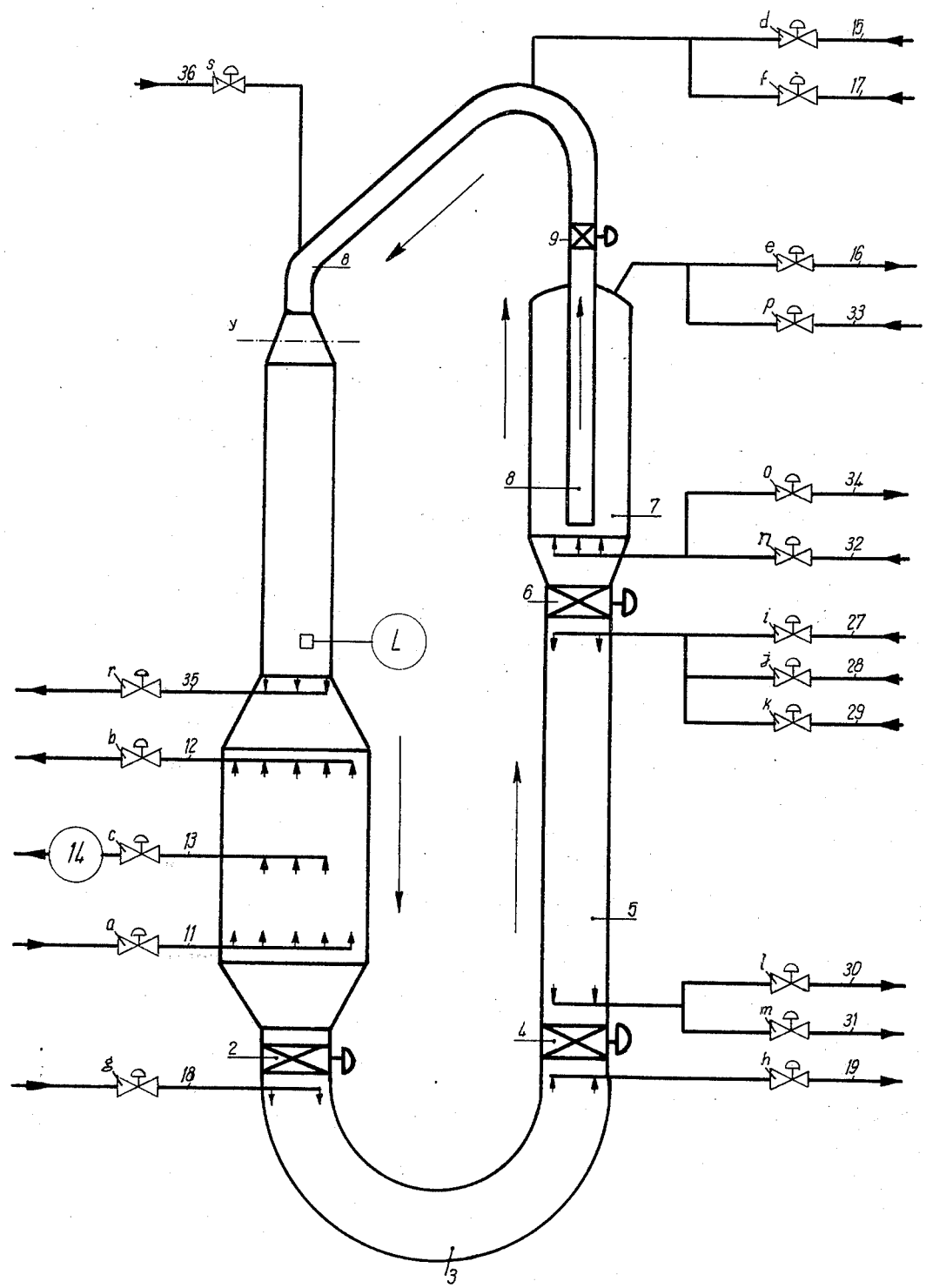
FIG. 1 schematically illustrates a moving-bed ion-exchange apparatus, according to the invention, in vertical section.

A moving bed ion-exchanger apparatus is made up of two parallel vertical cylindrical columns, bottom connected, as depicted in FIG. 1 and consists of cylindrical sections superposed as follows: a loading section 1 provided at the lower part with an isolating valve 2 of the butterfly or knife gate type, that separates it from the conditioning section 3 coinciding with the column connecting duct and ending with an isolating valve 4 of the butterfly or knife gate type.

Valve 4 isolates the conditioning section 3 from a regeneration section 5 provided at the tope with a butterfly or knife gate valve 6 that separates the regeneration section 5 from a backwash section 7.

Backwash section 7 is provided with a siphon-like connection pipe 8 reaching almost to the bottom of the backwash section and connecting it through an isolating valve 9 of butterfly — or knife gate type, to a storage section 10 for the regenerated ion resin that is located above the loading section 1 and connected to it through a taper part.

Initially, the ion-exchange resin is disposed in the spaces of sections 1, 3, 5 and 10. The influent to be treated enters the pipe 11 and valve $a$ at the bottom of the loading section 1 and is distributed uniformly across the section 1 through one or more distributing pipes provided with filtering elements.

The influent moves upwardly into and through the resin bed and leaves it as treated effluent through one or more collecting pipes 12 provided with filtering elements via valve $b$.

In order to signal the exhaustion of resins by the ions in the influent to be treated, at about 2/3 from the bottom of the distributing and collecting pipes, a sample of the treated liquid is continuously extracted through one or more collecting pipes provided with filtering elements. The liquid that is led through the pipe 13 and valve $c$ to a specific analyzer 14 that serves to analyze the physico-chemical characteristics of the extracted liquid over a preset optimum value.

This specific analyzer can be a pH-meter, a conductometer, an ion-selective analyzer or some other type of analyzer.

In order to achieve compactness of the exhausted resin in upward flow, a downward liquid flow enters the pipe 17 and valve $f$ at the upper part of the storage section 10 and moves across the ion-exchange resin bed in the storage zone and goes out through the collectors and pipe 12, simultaneously with the treated effluent.

When the value of the detected physico-chemical characteristic of the liquid extracted from the loading section exceeds the preset optimum value, due to the exhaustion of the ion-exchange resin;

between the sample distributing and collecting pipes space, the analyzer 14 controls the closing of the valves $a$ and $b$, the opening of valve $d$ in pipe 15 for transfer water, the opening of separating valves 2, 4, 6 and the opening of valve $e$ in pipe 16 for discharge of the liquid from the backwash section 7.

On account of the pressure difference of about 2 $Kgf/cm^2$ generated between section 10 and section 7, the ion-exchange resin is pushed as shown by the long arrows, so that the fresh resin in section 10 will displace the exhausted resin in section 1, the exhausted resin from section 1 will be transferred to section 5 and the regenerated resin in section 5 will be transferred into section 7.

When the liquid-resin interface (y), initially at the upper part of the storage section 10, on its way downward passes the level sensor L located at the bottom, this causes the sequenced closing of the valves e, 6, 4, 2 and d, the opening of valve f on the pipe 17 for compacting water and the opening of the valves b, c and a for recommencing the ion-exchange operation.

At the same time the level sensor L trips the operation of a timer actuating valves g, h, i, j, k, l, m, n, o, p, r, q, s and 9 according to a time sequence so that the conditioning, regeneration, rinsing, backwashing and transferring of the regenerated resin back into the storage section are achieved.

The level sensor, L, can be either a sonic sensor, an optic instrument provided with photodiodes, or a device with a vibrating probe, whose frequency ranges from 100 to 300 Hz, etc.

In the conditioning section 3, the ion-exchange resin exhausted in section 1 is conditioned to meet the regeneration requirements.

Thus, the resin in section 3 is rinsed to remove the contaminated liquid entrained along with the ion resin during the transfer, and to cool the resin before regeneration.

The wash and/or cooling liquid is introduced through pipe 18, valve g and is distributed all across the section length through pipes provided with filtering elements. The liquid flows through the resin bed and goes out through collecting pipes with filtering elements, valve h and pipe 19.

Figure 2:
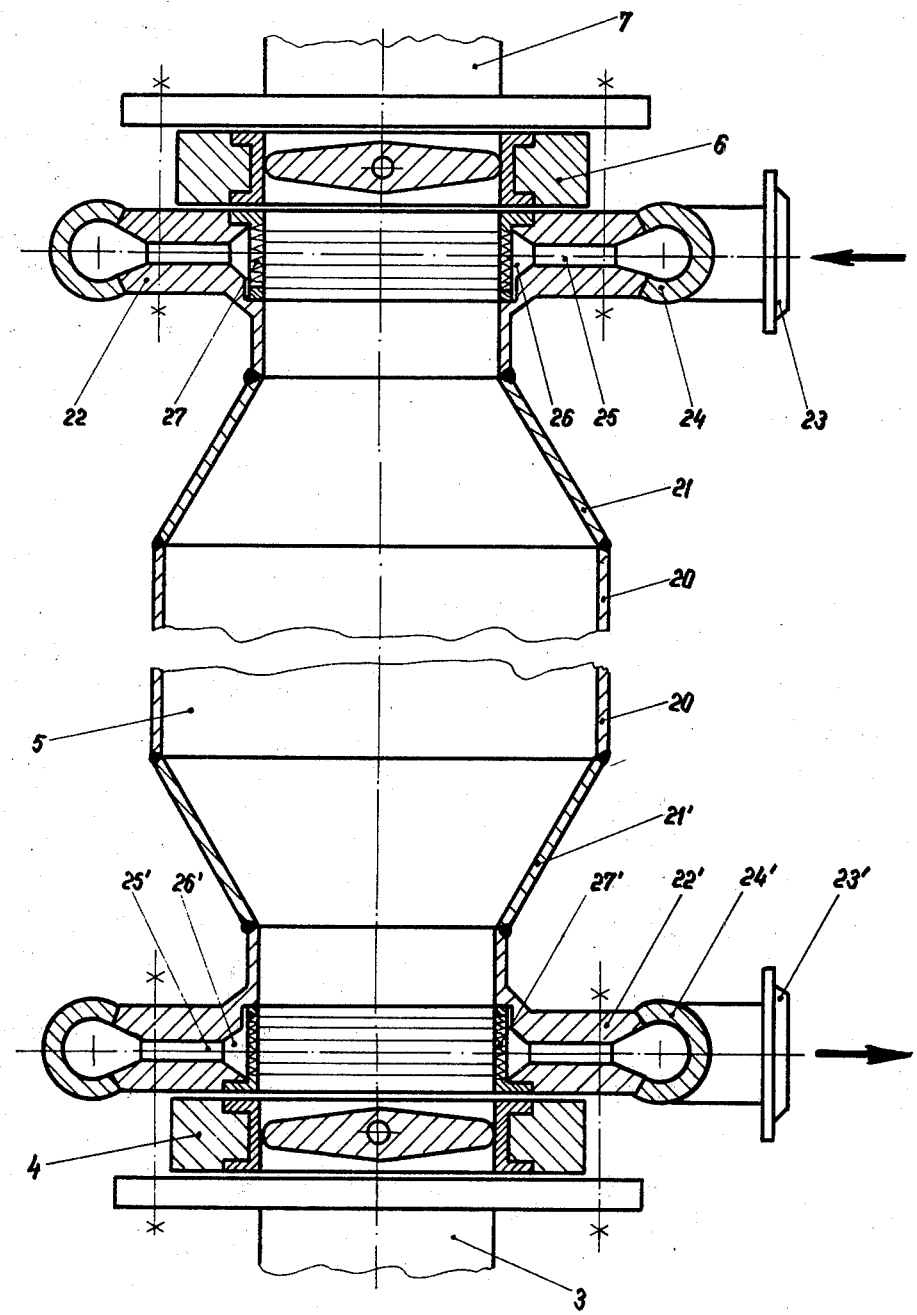
FIG. 2 schematically illustrates the regeneration section with filtering flanges.

The regeneration section 5, as illustrated in FIG. 2, consists of a vertical cylindrical body 20, having bottom and top taper sections 21 and 21' and two filtering flanges 22 and 22'. To ensure an even and thorough distribution of the liquids introduced for the regeneration, and first washing (I), of the exhausted ion resin, across the entire resin bed, the filtering flanges 22 and 22' permit an even inflow and discharge of liquids through nozzles 23 and 23', circular collectors 24 and 24', distribution chambers 26 and 26', and circular filtering elements 27 and 27'.

The section 5 is isolated by the butterfly valves 4 and 6. Into this section, through nozzle 23, the regenerant, the wash liquid and possibly the nitrogen for interstitial liquid purging are introduced by pipes 27, 28 and 29 through valves i, j, k respectively, while through nozzle 23' the instertitial liquid and the regeneration product are discharged by pipes 30, 31 via valves l and m, respectively.

The section 7, in which backwash and final wash (II) of the ion-exchange regenerated in section 5 is achieved, consists of a vertical cylinder provided at the bottom with a taper element connecting it to the regenerating section 5 by means of butterfly valve 6. It is provided inside, axially, with a vertical syphon pipe 8 and a butterfly or knife gate valve 9 through which the backwashed ion resin is hydraulically carried out from the bottom of the backwash section into the ion-exchange resin storage section 10.

The storing section is connected to the transporting pipe 8 and the loading section 1 through taper elements. Into the backwash section 7 the backwash liquid and/or resin wash is introduced at the bottom through pipe 32, valve n and distributing pipes provided with filtering elements.

The liquid moves through the resin bed, expanding it by 50–60%, and is discharged together with resin fines through pipe 16 and valve e.

At the end of the backwash operation, for hydraulically transporting the resin, the latter is compacted by introducing a liquid downward through pipe 33 and gate valve p, the liquid being discharged through pipe 34 and valve o.

After compacting of the ion-exchange resin, it is hydraulically transported to the storage section by the pressure difference between section 7 and section 10, in a liquid stream introduced through pipe 33 and discharged through pipe 35 with a valve r.

While the ion-exchange resin is hydraulically transported from section 7 to section 10 the slide valve 9 is opened. The ion-exchange resin required to complete the resin losses in the columns is hydraulically introduced through pipe 36 and slide valve s, at the upper part of the storage section.

EXAMPLE 2

Figure 3:
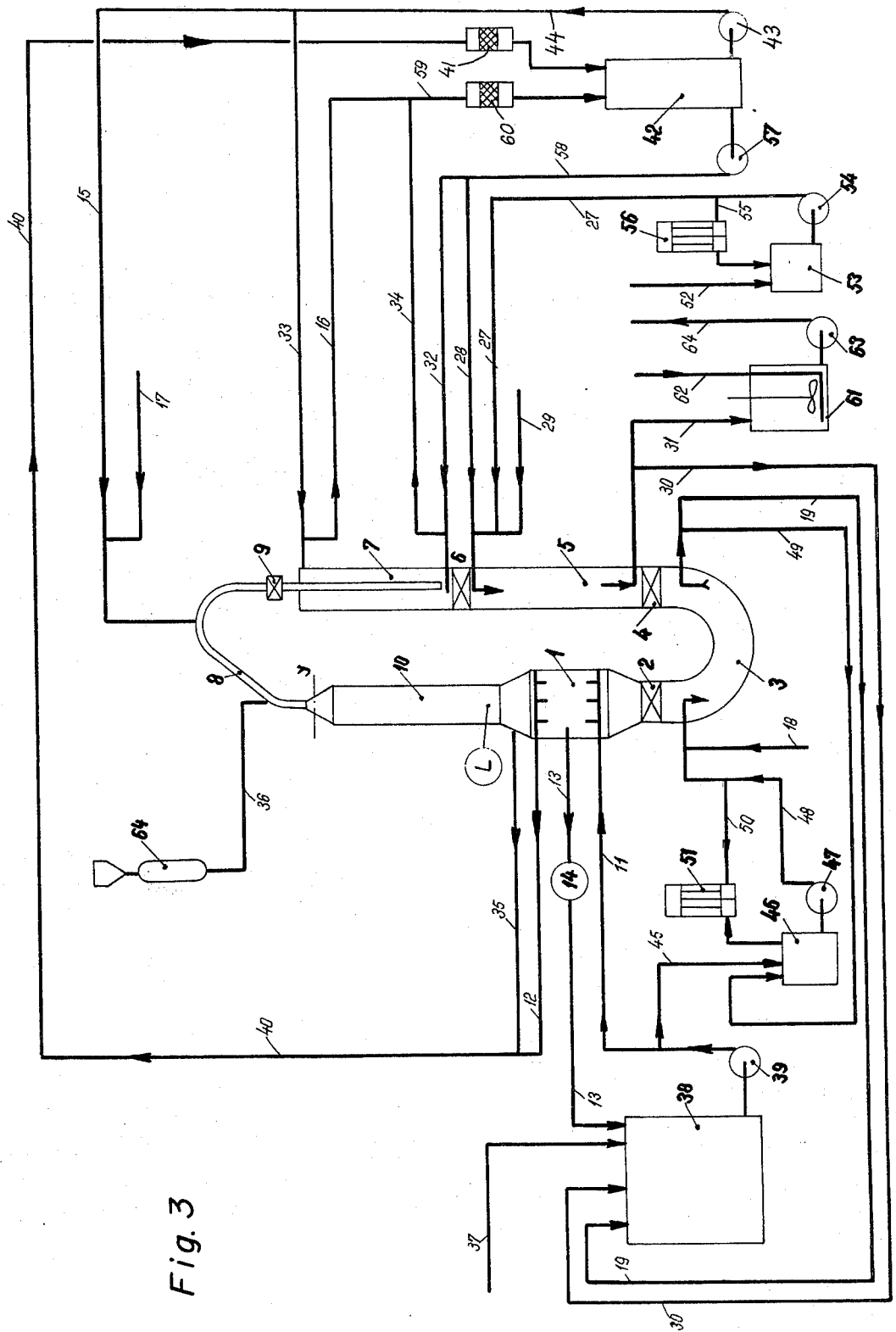
FIG. 3 schematically illustrates the moving-bed ion-exchange apparatus employed in the treatment of waste waters containing $NH_3$ and $NH_4NO_3$.

The apparatus described in "Example 1" is used for treating 2 g/l $NH_3$ and 5 g/l $NH_4NO_3$ waste waters at a temperature of 40°C within the installation shown in FIG. 3. The waste water is brought by pipe 37 to a buffer tank 38 from which, by means of pump 39, it is introduced through pipe 11 into the ion-exchange column at the bottom of the loading section 1. The water moves upward through the strong acid cationic resin bed and a composition of 4 g/l $HNO_3$ and about 15–30 mg/l $NH_4^+$ ion by pipe 12, pipe 40 and filter 41 to the tank 42.

After saturation of the cationic resin in the loading section 1, sensed by analyzer 14 (pH-meter), this is transferred to cooling and rinse section 3, regeneration section 5 and backwash section 7, by pushing with water taken over from tank 42 with a pump 43 and discharged through pipe 44 and pipe 15 to the section 10 upper part.

As the resin moves, the water discharged through pipe 16, pipe 59 and filter 60 is collected in the tank 42.

The resin movement is stopped when the saturated resin volume is replaced by the fresh resin in the storage section 10 and the liquid-resin interface y moves downwardly into the minimum preset level, sensed by level detector L.

The level detector can be either vibration devices (100–150 Hz), photodiode instruments, or sonic sensors.

After completion of resin transfer the isolating valves 2, 4 and d close and the resin saturated with $NH_4$ ion is subjected to the operations of cooling, washing, regeneration with 56% $NHO_3$ according to U.K. Pat. No. 1331948/1970, rinsing I with water, backwash, rinsing II and return to the storage section 10.

In order to achieve resin cooling from 40°C to 18°C, a part of $NH_3$ and $NH_4NO_3$ waste water introduced through a pipe 45 into a vessel 46 is recirculated with a pump 47 through a pipe 50 and a cooler 51, cooled with water at +5°C until waste water cooling at +8°C occurs. Waste water is taken over by pump 47 and introduced by pipe 48 into the washing-cooling section 3, from where it goes through the resin bed cooling it being then discharged at a temperature of about +15°C through pipe 49 back to tank 46.

$NH_3$ and $NH_4NO_3$ water left in the resin interstitial space of section 3 is displaced by washing with demineralized water, introduced through a pipe 18 and discharged through a pipe 19 into tank 38.

Resin regeneration in section 5 is performed by using 56% $HNO_3$ introduced by pipe 52 into a vessel 53 and cooled to 10–15°C by recirculating it with a pump 54 through pipe 55 and through cooler 56.

Cooled $HNO_3$ is introduced with pump 54 by line 27 to the regeneration section 5 upper part in a proportion of about 0.28 volumes of 56% $HNO_3$ resin volume but before that the water in the ionic resins voids is discharged into tank 38 by pipe 30 with nitrogen blown through pipe 29.

The resin regenerated with 56% $HNO_3$ is first washed in the stage I with 0.7 – 0.8 liquid volumes/resin volume, taken over from tank 42 with a pump 57 and introduced through pipe 58 and pipe 28 to the top of regeneration section 5. The regeneration product containing $NH_4NO_3$ and excess of $HNO_3$ are discharged through pipe 31 into a tank 61 for $NH_4NO_3$ acidic solutions, where the solution is neutralized with 100% $NH_3$ introduced through pipe 62. The 20–28% $NH_4NO_3$ solution resulted from neutralization is transported by a pump 63 through a pipe 64 to a concentration unit in order to be concentrated to 74–85% and further used in the manufactured ammonium nitrate. The regenerated resin final rinsing II, is performed in section 7 concomitantly with the backwash, by introducing wash liquid, taken over from tank 42 by pump 57, through pipe 58 and pipe 32 to the section 7 bottom, and returned through pipe 16, pipe 59, filter 60 back to tank 42.

The backwash liquid causes the resin bed expansion by about 50–60% a fact that allows fine particles to be removed that are retained by filter 60. The regenerated and backwashed resin is hydraulically transported by pipe 8 to storage section 10 by pushing with liquid taken over from tank 42 with pump 43 and introduced into the section 10 top part by pipe 44 and pipe 15. The conveyance liquid is discharged from the storage section 10 through pipe 35 and returned through collecting 40 to buffer tank 42 after its passing through filter 41.

During resin loading, the cationic resin is compacted by introducing water through pipe 17, water which is discharged at the same time as the treated waste water goes out through pipe 12.

The loading cycle lasts at least 15 minutes while that of cooling, regeneration-washing, backwash-transport lasts 13 minutes at most. To transfer the resin by hydraulic pulsation takes about 2 minutes.

Figure 4:
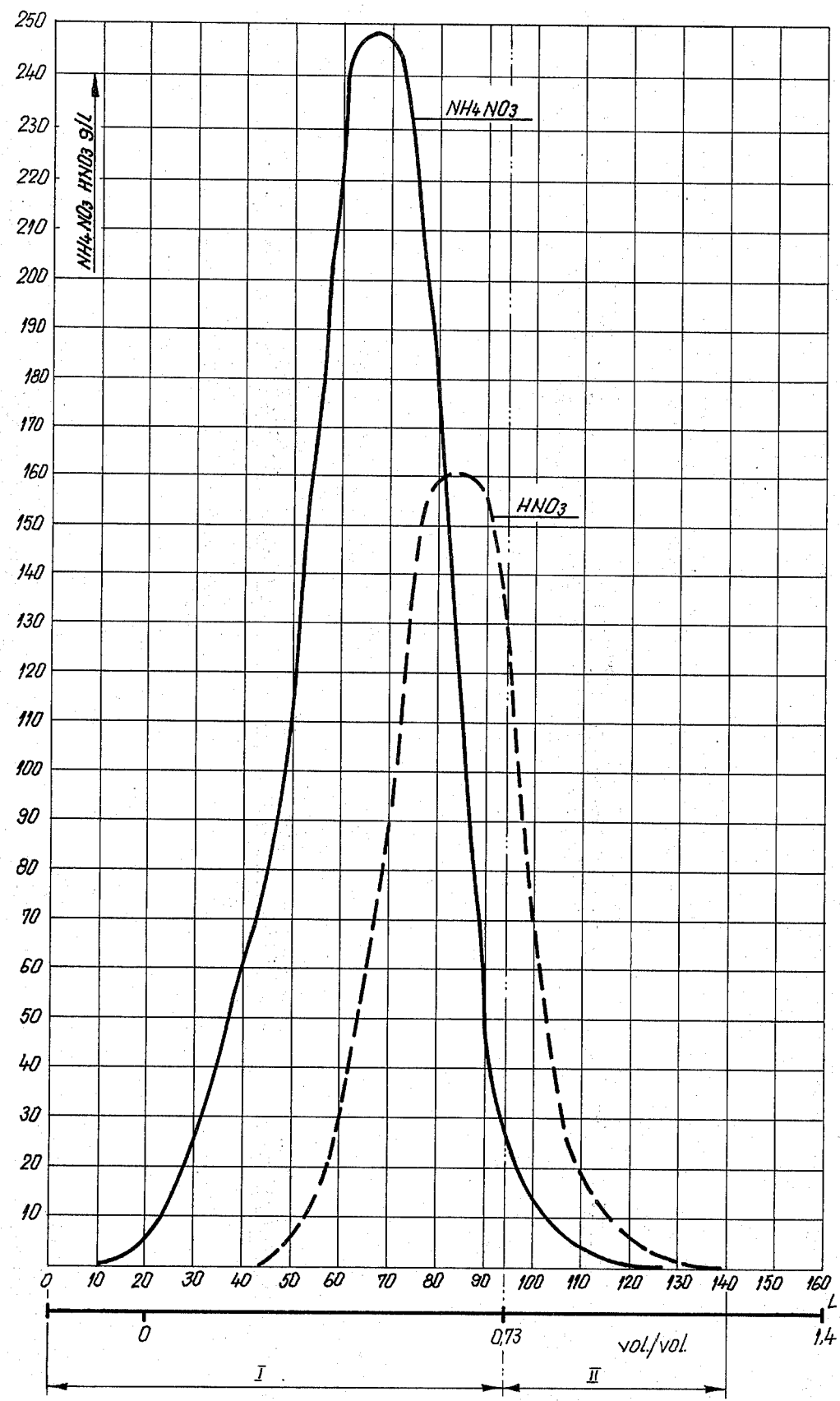
FIG. 4 schematically illustrates the curves of $NH_4NO_3$ and $HNO_3$ concentration variation during the DUOLITE C 265 cationic resin generation with 50% $HNO_3$.

FIG. 4 shows the curves of $NH_4NO_3$ and $HNO_3$ concentration variation resulting from the DUOLITE C 265 cationic resin regeneration with 0.28 volumes of 50% $HNO_3$/resin volume.

To obtain a $NH_4NO_3$ concentrated solution, there are required 2 washing stages: first stage (I), in the regeneration section 5, with 0.7–0.8 volumes of water/resin volume and final stage (II) in the backwash section 7, with 0.8–1.2 water volumes/resin volume.

On the ordinate there is represented the concentrations in g/l of $NH_4NO_3$ and excess of $HNO_3$.

On the abscissa there are represented the rinse liquid volume in liters and the ratio: liquid/resin volume.

The ammonium nitrate solution resulting from the first washing stage contains about 20–28% $NH_4NO_3$.

EXAMPLE 3

Figure 5:
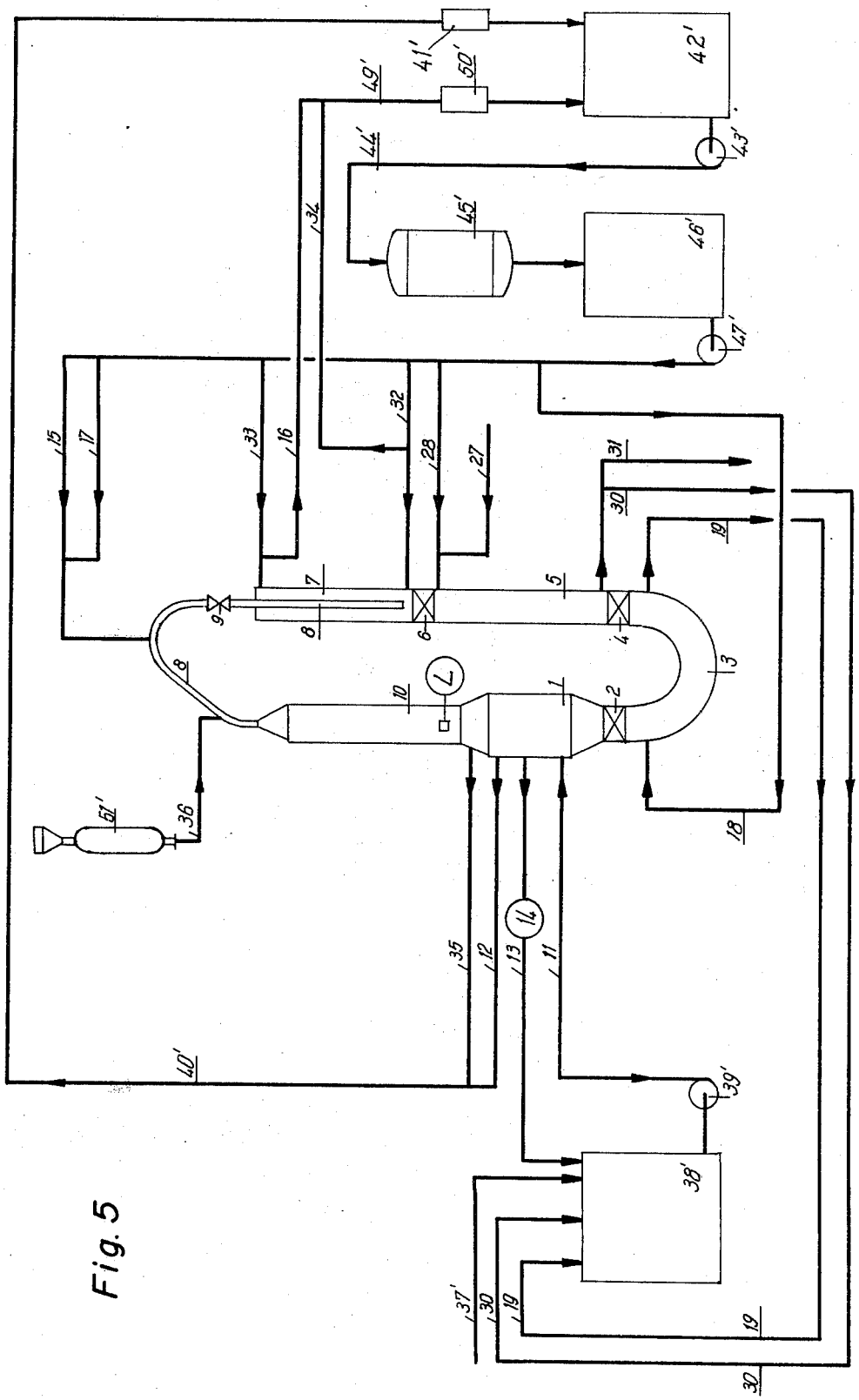
FIG. 5 schematically illustrates the moving-bed ion-exchange apparatus employed in the treatment for waste waters containing $HNO_3$.

Waste waters having a composition of 4 g/l of $HNO_3$ and 15–30 mg/l of $NH_4^+$ ions, are treated in a unit as shown in FIG. 5. The waste waters are introduced through a pipe 37' into a tank 38' from where by a pump 39' they enter the pipe 11 through the loading section 1 bottom and after passing upward across the bed of DUOLITE A 366 polyacrylic weak-base anionic resin, they are discharged by pipe 12 placed at the loading section top side into a collecting pipe 40, across a filter 41' and are finally collected into a tank 42'.

The treated effluent, containing about 15–30 mg/l $NH_4^+$ and 4–20 mg/l $NO_3^-$, is displaced by a pump 43' and introduced by a pipe 44' into a mixed-bed filter 45' where the $NH_4^+$ and $NO_3^-$ ions are retained, after which the high purity demineralized water (0.3 s/cm) resulted is collected into a tank 46'.

After saturation of the anionic resin bed in the loading section 1, detected by a conductivity controller 14, the resin is successively transferred to rinse section 3, regeneration section 5, backwash section 7, and returned back to the storage section 10 by passing through pipe 8.

The interstitial liquid washing, containing $HNO_3$, is made in section 3 with demineralized water, taken over from tank 46', by a pump 47' and introduced by pipe 18 into the resin bed and discharged off by a pipe 19 into tank 38'.

The regeneration of DUOLITE A 366 resin is carried out in section 5 with a 16–18% $NH_3$ ammonia solution in 0.28–0.38 volumes/resin volume, entering the top of a pipe 27, the displaced interstitial liquid thereof being discharged through a pipe 30 into tank 30'.

The regenerated product washing is achieved in two stages: first stage (I) — in the regeneration section 5 with demineralized water introduced by a pipe 28 in a proportion of 0.8 – 0.9 water volumes/resin volumes, the resulting 16–20% $NH_4NO_3$ solution along with the excess of $NH_3$ being collected by a pipe 31 and directed to neutralization and concentration.

The resin backwash and final washing II is carried out in section 7 by expanding by 50% the resin bed in an upward stream of demineralized water, taken by tank 46', through pump 47', pipe 48' and pipe 32, and further discharged by pipe 16, pipe 49' and a filter 50' into tank 42'.

The regenerated, washed and backwashed resin is further compacted downward by water introduced by pipe 33, discharged through pipe 34, filter 50' into tank 42', after which it is transferred by pipe 8 from section 7 to storage section 10 by means of water introduced through pipe 33.

Transport water is discharged by pipe 35, collecting pipe 40' and filter 41' into tank 42'.

Compacting of the resin is effected in the loading section 1 by means of demineralized water introduced by pipe 17, downwardly, being eliminated concomitantly with the treated effluent by pipe 12, collecting pipe 40' into tank 42'.

To make up losses, the anionic resin is stored in tank 51' from which, by means of pipe 36, it is delivered to the top of the storage tank 10.

Figure 6:
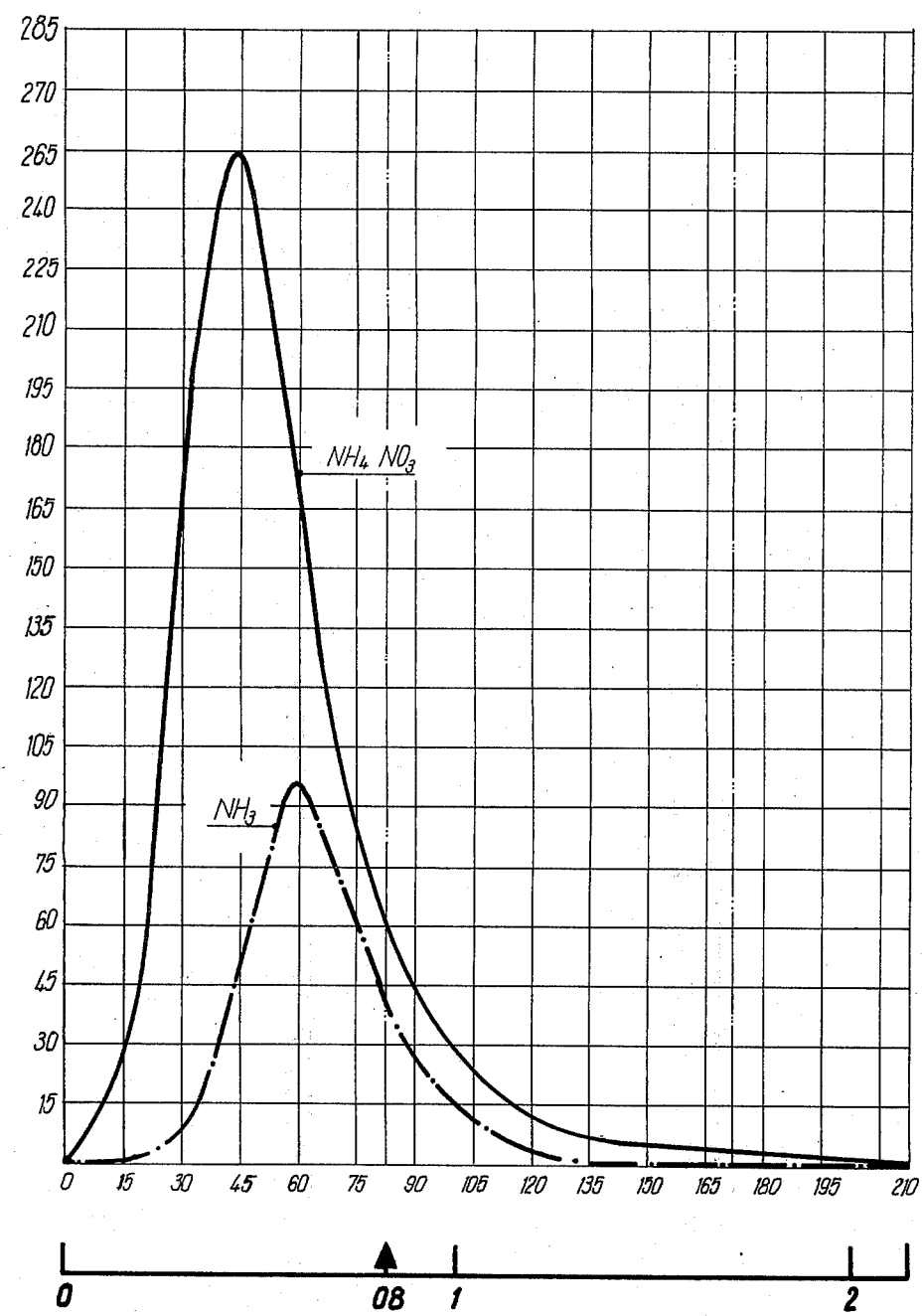
FIG. 6 schematically illustrates the curves of $NH_4NO_3$ and $NH_3$ concentration variation during the regeneration with 17–18% $NH_3$ of DUOLITE A 366 weak base anionic resin.

The FIG. 6 illustrates the variation curves of $NH_4NO_3$ and $NH_3$ concentration after regenerating DUOLITE A 366 weak base anionic resin by 0.28 volumes of 16% $NH_3$/resin volume.

What is claimed is:

1. An ion-exchange apparatus having therein a movable bed of an ion-exchange resin for treating an ion-containing liquid influent for loading the ion-exchange resin with ions from said influent followed by regeneration of the ion-exchange resin and recovery of an effluent from said resin constituting a concentrated solution of said ion, said apparatus comprising two vertical columns connected to one another at their upper and lower ends, said columns being formed with:
  a. a loading first section for the loading of the preselected kind of ion from the influent onto said ion-exchange resin, said loading section having:
    a central cylindrical portion terminating at its top and bottom in tapered portions,
    a first resin valve at a lower part of said column adjacent the lower tapered portion,
    means which includes an inlet pipe provided with a valve for introducing said liquid influent across a horizontal cross section of said cylindrical portion, said liquid influent traversing the bed of resin in said cylindrical portion upwardly toward the upper part of said loading section, said means further including an outlet pipe provided with a valve for removing said liquid influent over the horizontal cross section of said upper part, and
    a sample-removing pipe for continuously removing a sample of flowing influent connected to said cylindrical portion at a level of about two thirds the height of said bed, said sample-removing pipe being connected to an analyzer responsive to the concentration of said preselected kind of ion in the liquid influent;
  b. a conditioning-rinsing second section extending from said first resin valve along the portion of the apparatus connecting said columns at the bottoms thereof and terminating at a second resin valve provided at the lower end of the second column, said conditioning-rinsing section being constructed and arranged to receive by hydraulic transfer a batch of the ion-exchange resin exhausted in said loading section, the conditioning-rinsing section being provided:
    adjacent said first resin valve with means for introducing a conditioning liquid and rinsing water through an inlet pipe controlled by a valve, and
    adjacent said second resin valve with means for removing said conditioning liquid and rinsing water connected to an outlet pipe controlled by a valve;
  c. a third regenerating and first rinsing section in said second column above said second resin valve, said regenerating and first rinsing section terminating at a third resin valve in said second column, said resin batch being hydraulically displaced upwardly from said conditioning-rinsing section to said regenerating and first rinsing section, said regenerating and first rinsing section comprising:
    first distributing means adjacent third resin valve and including a cylindrical filter connected to three pipes each controlled by a respective valve for feeding strongly concentrated liquid regenerating agent, rinsing water and inert gas into the resin batch, the fluids thus introduced passing downwardly through the resin batch in said regenerating and first rinsing section, and
    second distributing means adjacent said second resin valve and including a cylindrical filter connected to two conduits each controlled by a respective valve for discharging an effluent concentrated in eluted salts and excess regenerant;
  d. a final-rinsing fourth section for the final rinsing and backwashing of the ion-exchange resin upon regeneration and rinsing thereof in said third section, said fourth section extending above said third resin valve in said second column to the upper part thereof, said fourth section comprising:
    a siphon conduit reaching downwardly through the interior of said fourth section and opening close to the bottom thereof,
    means including two pipes each controlled by a respective valve for respectively introducing rinsing and backwashing water into said fourth section at a lower part thereof and for the discharge of compacting water at the lower part of said fourth section, and
    means at an upper part of said fourth section including two pipes and respective values for respectively removing the rinsing and backwashing water from and for feeding compacting water to said fourth section, said compacting water further causing the resin to transfer through said siphon conduit;
  e. an hydraulic transfer conduit connecting said columns at the tops thereof and communicating with said siphon conduit, said hydraulic transfer conduit further including:
    a fourth resin valve connecting said hydraulic transfer conduit to said siphon conduit,
    means including at least one pipe and a pair of valves for respectively feeding resin shifting water and resin compacting water to said hydraulic transfer conduit, and
    means for introducing additional resin to said apparatus at an end of said hydraulic transfer conduit connected to said first column; and
  f. a resin-storage fifth section formed in said first column above said first section and communicating with said end of said hydraulic transfer conduit, said fifth section comprising:
    a tapered portion at the upper end of said fifth section connecting same with said hydraulic transfer conduit,
    a resin/water interface sensor at a lower portion of said fifth section for detection of the advance of a resin/interface from the top of said fifth section toward said first section, and
    means including a pipe and a valve at the bottom of said fifth section for removing transfer water.

2. The ion-exchange apparatus defined in claim 1 wherein said first and second distributing means each comprise an outer annular distributor which communicates with an inner annular distributing chamber feeding the respective cylindrical filter, each filter being constructed with small openings to retain beads of the ion-exchange resin.

3. A method of operating an ion-exchange apparatus having therein a movable bed of an ion-exchange resin for treating an ion containing liquid influent, said apparatus comprising two vertical columns connected to one another at their upper and lower ends, said method comprising the steps of:
  a. passing said influent upwardly through a bed of said resin in a loading section formed in a first one of said columns, and removing said influent at the top of said bed after it has traversed the same, thereby loading said ion-exchange resin with ions from said influent;

b. continuously monitoring the concentration of said ions in the liquid influent traversing said bed at about two thirds of the height of said bed;

c. upon saturation of said bed the said ions as determined in step (b), transferring the ion-exchange resin of said bed hydraulically downwardly into a conditioning-rinsing section formed in a duct connecting the bottoms of said columns and confining the saturated resin in said conditioning-rinsing section;

d. passing a conditioning liquid and rinsing water through the resin confined in step (c);

e. thereafter hydraulically displacing the resin treated in step (d) into a regenerating section formed at a lower part of the other of said columns and confining the resin therein;

f. passing a highly concentrated regenerating liquid and rinse water downwardly through the resin confined in step (e) to regenerate and rinse the resin;

g. hydraulically displacing the resin treated in step (f) upwardly into a final rinsing section formed in said other column at the upper portion thereof and confining the resin in said final rinsing section;

h. rinsing the resin confined in step (g);

i. backwashing the resin rinsed in step (h) with a liquid introduced into the bottom of said final rinsing section;

j. hydraulically displacing the resin from the bottom of said final rinsing section upwardly and thereafter downwardly to the top of the first mentioned column;

k. storing the resin hydraulically transferred in step (j) in a storage section at the top of said first column;

l. adding additional resin to the resin hydraulically transferred in step (j) immediately above said storage section;

m. feeding the resin stored in said storage section downwardly into the loading section of step (a) progressively; and n. terminating the displacement of the resin from said storage section upon a resin/liquid interface therein descending to a predetermined level.

4. The method defined in claim 3 further comprising the step of hydraulically compacting the resin in said loading section.

5. The method defined in claim 3 wherein prior to regeneration of the resin by said regenerating liquid, excess liquid is expelled from the resin by purging the same with an inert gas, said highly concentrated regenerating agent being selected from the group which consists of 45–60% nitric acid, 30–50% sulfuric acid, 35–40% phosphoric acid and 17 to 25% ammonia solution, the regenerating liquid being employed in an amount of 0.28 to 0.45 volumes per bulk volume of the resin.

6. The method defined in claim 5 wherein said resin is treated immediately following the treatment with said highly concentrated regenerating liquid with water in an amount of 0.7 to 0.9 volumes of water per bulk volume of the resin to displace a regeneration product from the interstices of the resin in the form of a effluent containing a high concentration of eluted salts and excess regenerating liquid.

* * * * *